(12) United States Patent
Abramov et al.

(10) Patent No.: US 8,184,601 B2
(45) Date of Patent: May 22, 2012

(54) METHOD FOR RADIO COMMUNICATION IN A WIRELESS LOCAL AREA NETWORK WIRELESS LOCAL AREA NETWORK AND TRANSCEIVING DEVICE

(75) Inventors: Oleg Yurievich Abramov, St. Petersburg (RU); Semen Aleksandrovich Khitrik, St. Petersburg (RU); Aleksandr Nikolaevich Kirdin, St. Petersburg (RU); Yury Pavlovich Sukharnikov, St. Petersburg (RU)

(73) Assignee: Airgain, Inc., Carlsbad, CA (US)

( * ) Notice: Subject to any disclaimer, the term of this patent is extended or adjusted under 35 U.S.C. 154(b) by 2329 days.

(21) Appl. No.: 10/494,104

(22) PCT Filed: Oct. 31, 2002

(86) PCT No.: PCT/RU02/00488
§ 371 (c)(1),
(2), (4) Date: Sep. 2, 2004

(87) PCT Pub. No.: WO03/039026
PCT Pub. Date: May 8, 2003

(65) Prior Publication Data
US 2011/0096756 A1    Apr. 28, 2011

(30) Foreign Application Priority Data

Nov. 1, 2001   (RU) .................................. 2001130433

(51) Int. Cl.
*H04W 4/00*    (2009.01)
(52) U.S. Cl. ......................... 370/338; 370/328; 370/310
(58) Field of Classification Search ........................ None
See application file for complete search history.

(56) References Cited

U.S. PATENT DOCUMENTS 5,912,921 A    6/1999  Warren et al.
(Continued)

FOREIGN PATENT DOCUMENTS

EP    0859490    8/1998
(Continued)

OTHER PUBLICATIONS

U.S. Appl. No. 09/797,085, filed Aug. 9, 2001.
(Continued)

*Primary Examiner* — Hassan Phillips
*Assistant Examiner* — Gautam Sharma
(74) *Attorney, Agent, or Firm* — Clause Eight IPS; Michael Catania

(57) ABSTRACT

The invention refers to wireless local area networks (WLAN) consisting of a multitude of transceivers capable of establishing communication with one another (i.e. operating in a peer-to-peer mode) under the control of network coordinator (the so-called "ad hoc" networks). Implies the assignment of the role of the temporary coordinator to a transceiver from among the plurality of transceivers, switching-over other transceivers into the mode of a network client, orientation of antenna beam of a transceiver (switched-over into the client mode) equipped with a direction-agile antenna in the direction of the temporary coordinator of the network and transmission of information to an addressee by a client-transceiver of this network that has got the permission to transmit from the temporary coordinator. A WLAN comprises a multitude of transceivers, one of which serves as a temporary coordinator for said network and at least two of which have a direction-agile antenna and means for the operation of said antenna in the omnidirectional mode, in the directional scanning mode or in the stationary directional mode, an identification means responsive to transmission of a signal, including the transmission of a synchronization signal or identification signal intended for orienting said antenna in the direction of said signal being transmitted. The invention improves the quality and reliability of communication for WLAN users (including mobile users) thus increasing the data transfer rate.

26 Claims, 11 Drawing Sheets

U.S. PATENT DOCUMENTS

| | | | | |
|---|---|---|---|---|
| 6,026,303 | A * | 2/2000 | Minamisawa | 455/446 |
| 7,043,252 | B2 * | 5/2006 | Khitrik et al. | 455/452.2 |
| 2001/0012275 | A1 * | 8/2001 | Caldwell et al. | 370/252 |
| 2001/0029189 | A1 * | 10/2001 | Mandyam | 455/522 |
| 2001/0031648 | A1 * | 10/2001 | Proctor et al. | 455/562 |
| 2002/0143911 | A1 * | 10/2002 | Vicente et al. | 709/223 |
| 2003/0202468 | A1 * | 10/2003 | Cain et al. | 370/229 |
| 2004/0014467 | A1 * | 1/2004 | O'Neill et al. | 455/422.1 |

FOREIGN PATENT DOCUMENTS

| | | |
|---|---|---|
| GB | 9900593 | 7/2000 |
| WO | PCT/DE96/00020 | 7/1996 |

OTHER PUBLICATIONS

U.S. Appl. No. 09/773,418, filed Aug. 9, 2001.
US 6,075,780, 6/2000, (withdrawn).
U.S. Appl. No. 09/795,003, filed Sep. 27, 2001.
U.S. Appl. No. 09/736,600, filed May 31, 2001.

* cited by examiner

|  | Transceiver of user 21 | Transceiver of user 22 |  | Transceiver of user N |
|---|---|---|---|---|
| Transceiver of user 21 |  | Communication quality S/N |  | Communication quality S/N |
| Transceiver of user 22 | Communication quality S/N |  |  | Communication quality S/N |
|  |  |  |  |  |
| Transceiver of user N | Communication quality S/N | Communication quality S/N |  |  |

Fig. 8

METHOD FOR RADIO COMMUNICATION IN A WIRELESS LOCAL AREA NETWORK WIRELESS LOCAL AREA NETWORK AND TRANSCEIVING DEVICE

FIELD OF THE INVENTION

The invention claimed herein refers to wireless local area networks (WLAN) that include a plurality of users, namely, to methods and equipment used in said networks for the purpose of exchange of various types of information between a number of users that vary in time and that are capable of establishing communication with one another (i.e. operating in the peer-to-peer mode) under the control of network coordinator (the so-called "ad hoc" networks).

BACKGROUND OF THE INVENTION

Currently WLANs are finding more and more extensive use in the field of information science and videographic communication for the purpose of transmission and distribution of data and other information among multiple users located inside the same building (for example, among personal computers, laptop computers, printers and other users without any restrictions on the "mobility" of these devices). Transmission of information with the use of WLAN allows one to reduce network cost because there is no necessity of laying connecting wires. A network of this type can be also used in those cases when it is either difficult or impossible to lay connecting wires and in cases when there are no socket connectors for local networks due to architectural restrictions. WLAN represents an ideal solution for an institution at which the arrangement of users is often changed. In existing WLANs, radio communication is usually arranged in compliance with known international standards, such as IEEE 802.11, IEEE 802.11a, IEEE 802.11b, ISO 8802-11 and HIPELAN of type 2. Temporary networks (i.e. the networks in which number of users may vary and information can be transmitted under the control of network coordinator either simultaneously to an arbitrary number of users or directly from one user to another) are arranged based on the above-mentioned standards.

The known methods for radio communication in a WLAN are based on the use of both permanent and temporary coordinators of a network—that is, devices that provide for the conditions for the exchange of information between any users belonging to a given network (See U.S. Pat. Nos. 5,912,921; 6,026,303 and 6,075,780; U.S. patent application Ser. Nos. 09/797,085; 09/773,418; 09/795,003; and 09/736,600; Great Britain No. 9900593; and EPO Application Serial No. 0859490). These methods and adequate equipment allow one to arrange the ad-hoc networks intended for the simultaneous transmission of information to an arbitrary number of users (including mobile users).

For instance, the method of operation of a wireless radio communication system that includes a controller and a plurality of stations, each of which is equipped with a transmitting and receiving device is known (See U.S. patent application Ser. No. 09/773,418). The transmission of information from one station to another in the known method is performed at time slots assigned for each station by the controller. In this process a receiving station hstores information related to parameters of transmission by all other stations, and prior to the reception of a signal from a transmitting station said receiving station tunes its receiving device in accordance with the stored parameters of transmission of transmitting station—for example, signal level or frequency offset.

This method makes it possible to make the requirements to receiving devices of system stations less stringent. At the same time the use of the omnidirectional radiation of signal in this method limits the range radio communication system determined predominantly by the radiating power of a transmitting device and sensitivity of a receiving device, which parameters usually can not be enhanced significantly for WLAN users. Besides, the known method doesn't ensure sufficient reliability of radio communication due to possible influence of multipath interference in a signal reception point and due to the signal fading effect.

The known method is used in a radio communication system (See U.S. patent application Ser. No. 09/773,418) including a controller and a plurality of stations, and transmission of data in such a system is carried out at time intervals (time slots) allocated for each station by the controller. Each station in such a system is equipped with a transmitting and receiving devices plus a means intended for storing information on parameters of transmission by all other stations of the system and a means for tuning station's receiving device prior to receiving signal from transmitting station, with said tuning being dependent on stored information about the parameters of a signal from the transmitting station.

The known wireless communication system makes it possible to make the requirements to receiving devices of system stations less stringent. However, the use of omnidirectional antennas in transmitting and receiving devices of stations of this system has an adverse effect on the range of system stations. Besides, sufficient reliability of radio communication in the known wireless communication system is not ensured due to possible influence of multipath interference in a signal reception point and due to the signal fading effect.

Another method of the operation of an ad-hoc wireless network including a plurality of stations, each of which is equipped with a transceiver connected to antenna device for the purpose of communication with other stations of the network, is known (See U.S. patent application Ser. No. 09/797,085). Each station of the network is capable of operating both as a "master" station (i.e. coordinator) and as a "slave" station. Besides, each station is capable of determining rank for every other station with said rank being representative of other station suitability for performing the role of master station in a network. According to this method, at least one of the stations is capable of determining the rank of all stations in the network for performing the role of a "master" station (i.e. coordinator), and the station having the highest rank is selected as a "master" station (i.e. coordinator).

The known method allows nominating such a station as a network coordinator that is characterized by the best potential for the performance of this function. However, it is not possible to change the network coordinator in the known method when the conditions of network functioning are changed. Besides, the employment of the omnidirectional radiation of signal in the known method limits the range of stations in the network.

The known method is practically implemented in a wireless network (See U.S. patent application Ser. No. 09/797, 085) that includes a plurality of stations. Each station in the network is equipped with a transceiver connected to an antenna device, a controller for the purpose of performing the role of a "master" or "slave" station and a device for determining a rank for the station suitability for performing the role of the master station in the network. At least one of the stations is equipped with a special means for determining the rank of all stations in the network and means for delegating the role of a "master" station (i.e. coordinator) to a station having the highest rank.

The known wireless network performs the appointment of such a station as a network coordinator that is characterized by the best potential for the performance of this function. However, this network is incapable of changing the network coordinator ("master" station) in the network. Besides, the employment of omnidirectional antennas in this system limits the range of stations.

In terms of the entire set of essential features, the closest method to the invention claimed herein is the method for radio communication in an ad-hoc WLAN consisting of a plurality of transceivers, that implies selection of at least one transceiver as a temporary coordinator of said network, switching-over other transceivers into the client state, and collection by said temporary coordinator from each transceiver of data on their location and communication conditions with each client transceivers (See U.S. Pat. No. 6,026,303). If said temporary coordinator is incapable of collecting said data from all transceivers it switches-over to the state of a client transceiver, while one of the other transceivers is selected as a temporary coordinator of the network based on data on location of client transceivers in the network and conditions of communication with each client transceivers. The procedure described above is repeated until such a temporary coordinator is found that would be capable of collecting data on location of all client transceivers in the network and conditions of communication with each client transceivers. Such a temporary coordinator is then becomes a permanent coordinator of the network.

The known prototype method (See U.S. Pat. No. 6,026,303) allows one to choose such a transceiver as a coordinator that is capable of communicating with all transceivers of the network. However, the use of omnidirectional radiation of signal by client transceivers in this method limits the range of these transceivers in the network.

The prototype method is practically implemented through the use of an ad-hoc WLAN consisting of a plurality of transceivers, each of which includes a setting unit intended for setting a transceiver into the mode of temporary or permanent coordinator of the WLAN (when a signal for setting in these states is received) and for setting it into the client mode (when said signal is not received), a data collection unit intended for collecting data from each client transceiver about its location and conditions of communication with each client transceiver when the transceiver is switched-over into the temporary coordinator mode and a coordinator selection unit intended for selecting temporary coordinator, permanent coordinator and for transmitting a signal for setting into the state of temporary or permanent coordinator of the WLAN (See U.S. Pat. No. 6,026,303).

The known prototype ad-hoc WLAN allows one to choose such a transceiver as a coordinator that is capable of communicating with all transceivers of the network. However, the use of omnidirectional radiation of signal by client transceivers limits the range of these transceivers in the network.

SUMMARY OF THE INVENTION

The purpose of the present invention is to create such a method for radio communication and such an ad-hoc WLAN (implementing said method), which while having the advantages offered by the prototypes would enable one to increase the range of WLAN users, to increase the data transmission rate, to improve the quality and reliability of communication.

The stated task was performed due to the fact that the following steps are carried out in a method for radio communication in a WLAN consisting of a plurality of transceivers capable of peer-to-peer communication with one another:

assignment of the role of the temporary coordinator to a transceiver from among the plurality of transceivers;

switching-over other transceivers into the mode of a network client;

orientation of antenna beam of a transceiver (switched-over into the client mode) equipped with a direction-agile antenna in the direction of the temporary coordinator of the network, after which said temporary coordinator transmits a signal to one of the transceivers (switched-over into the client mode) permitting the transmission, while the transmitter that has received permission for transmission begins transmitting data to an addressee from among transceivers of the network.

Upon getting appointed as said temporary coordinator for a network, a transceiver, whose antenna is operating in the omnidirectional mode, can successively perform the following steps:

to transmit synchronization signal;

to transmit periodic signals for orienting antenna beam of at least one network transceiver equipped with a direction-agile antenna;

to transmit a request for connecting new client transceivers to the network.

A transceiver switched-over into the client mode can perform the reception of a request from the temporary coordinator for connecting to the network and the transmission of its identification signal to said coordinator for the purpose of subsequent connection to the network.

In response to received identification signal (sent by a client transceiver) a temporary coordinator can perform the transmission of confirmation of connection of client transceiver to the network, registration of said connection of client transceiver to the network, transmission of a list of client transceivers connected to the network to all client transceivers of the network.

Prior to the transmission of information to an addressee, a client transceiver can transmit a request for this transmission, and temporary coordinator of the network can receive and store requests from client transceivers.

The following steps can be performed when assigning the role of a temporary coordinator of the network and switching-over other transceivers in the network client mode:

the search conducted by a transceiver switched into the reception mode for a synchronization signal from a previously appointed temporary coordinator;

switching-over a transceiver from the reception mode into the of the temporary coordinator mode when there is no synchronization signal from a previously appointed temporary coordinator in the radio space;

switching-over a transceiver into the client transceiver mode when there is a synchronization signal from a previously appointed temporary coordinator of the network in the radio space.

A network transceiver (equipped with a direction-agile antenna) can perform the search for a synchronization signal by scanning the radio space with antenna beam in different directions.

A client transceiver can transmit data to an addressee both via the temporary coordinator and directly to said addressee.

Upon the reception of a signal from the temporary coordinator, each transceiver of the network can determine of the quality of communication with all other transceivers of the network and store the data on communication quality contained in received signals from other transceivers of the network.

Determination of said quality of communication may also include the transmission by each transceiver of the network of an identification signal including data on quality of communication with other transceivers of the network and, correspondingly, the reception by each transceiver of an identification signal from other transceivers of the network.

A network transceiver equipped with a direction-agile antenna can perform the reception of an identification signal when its antenna beam is oriented in the direction of a transceiver that operates in the mode of identification signal transmission.

A network transceiver can perform the transmission of data to an addressee from among the transceivers of the network by a route that provides for the quality of communication that either exceeds or equal to a specified threshold value.

The quality of peer-to-peer communication with said addressee may be taken as a specified threshold value.

The quality of communication may be determined based on the level of a signal being received or based on the signal-to-noise ratio.

It is possible to periodically repeat the cycle of said determination of the quality of communication and storage of said data on communication quality.

It is feasible to repeat the cycle of said determination of the quality of communication and storage of said data on communication quality at a time interval from 0.1 s to 100 s.

Data on communication quality stored after a previous cycle are replaced with data on communication quality stored after the next data determination cycle.

Data on communication quality stored after a previous cycle can be compared with data on communication quality stored after the next cycle. When the variation in data values of one cycle and data values of another cycle doesn't exceed a certain specified value, the time interval between cycles is either kept the same as it was or increased. When the variation in communication quality data values stored after a previous cycle and communication quality data values stored after the next cycle exceeds said certain specified value, the time interval between cycles is decreased.

The method for radio communication claimed herein is practically implemented in a WLAN that includes a plurality of transceivers, one of which is a temporary coordinator of said network. There are such transceivers in this network that are equipped with a direction-agile antenna and means for antenna operation in the omnidirectional mode, in the directional scanning mode and in stationary directional mode, plus identification means responsive to a transmission of a signal (including synchronization signal and identification signal) with the latter means being intended for the orientation of antenna in the direction of a signal being transmitted.

Network transceivers equipped with a direction-agile antenna may also include user-responsive means for transmitting an omnidirectional signal (including synchronization signal and identification signal), means intended for maintaining the operation of antenna in the scanning-reception mode (under the conditions of the absence of the above-mentioned signal), means responsive to an instruction from a user to cancel the functioning of the means intended for maintaining the operation of antenna in the scanning-reception mode, and means responsive to the transmission of a signal (including synchronization signal and identification signal), which is intended for orienting the antenna in the direction from said signal is being transmitted.

Each transceiver of the network may further include first means for separate transmission of an identification signal that includes data on the quality of communication by transmission route between this transceiver and other transceivers of the network, second means for the reception of an identification signal from each other transceiver and for the real-time determination of the best transmission route (among the available ones) based on communication quality data, and third means responsive to the reception of identification signals from other transceivers and intended for storing data on the quality of communication between all pairs of transceivers of the network. Said means for storing data may also include a link quality table and a means intended for periodic updating of this table. The period for updating said link quality table may either be specified in advance or represent a function of the frequency of communication quality variation.

Network transceivers operating in the transmission mode may include means for transmitting data to an addressee from among the transceivers of the network via a route that provides for the quality of communication that is at least equal to a threshold value.

Each of the transceivers of the network may also include a control means intended for the termination of the identification signal transmission and responsive to the reception of information being transmitted.

Network transceivers may also include means intended for comparing communication quality data with each successive transmission of an identification signal and for controlling time interval between a previous and next transmission of this signal.

Each transceiver may further include means intended for the reception and subsequent re-transmission of data not addresses thereto and means intended for the determination of a transmission route offering the highest quality of communication between a given transceiver and other transceivers of the network.

A network transceiver may include means responsive to a signal from temporary coordinator to perform the transmission of an identification signal, means for periodically determining (in successive periods) the quality of communication of the transmission paths between said transceiver and each of other transceivers in said network and for storing data representative of said communication quality for successive ones of said periods.

A network transceiver may include user responsive means for switching from the receiving mode to the transmission mode for transmitting a data packet, means responsive to the reception of a data packet being transmitted to a different receiver for re-transmitting said data packet along the highest quality communication path, and means for determining said highest quality communication path from said stored data representative of communication quality.

In the method claimed herein the scanning by antenna beam and orientation of antenna beam while receiving a signal (including synchronization signal and identification signal) can be carried out in different ways—namely, by azimuth bearing, by the angle of elevation and concurrently by azimuth bearing and angle of elevation. It is also possible to perform step-by-step scanning and orientation by electronic switching of antenna directional pattern. Step-by-step scanning and orientation can be also performed both within a pre-specified part of radio space offering better conditions for signal reception and within the entire radio space with a pitch of 45°, 60°, 90°, 120° or 180°. Besides, other scanning and orientation methods can be used (in addition to the above-named).

Orientation of antenna beams of network transceivers (equipped with a direction-agile antenna) in the direction of signal source can be performed based on the maximum value of at least one of the measured energy-related parameters of a signal being received—for instance, based on the maximum value of signal level or based on the maximum signal-to-noise ratio. To do so, the value of an energy-related parameter of a signal being received can be measured for different polarization of this signal. Subsequent reception of data package would be then carried out with a signal polarization, at which said energy-related parameter takes the maximum value.

In the course of data package reception it also makes sense to take measurements of at least one of the energy-related parameters of a signal being received (for instance, signal level or signal-to-noise ratio) and, when the measured value goes below a specified threshold value, to resume antenna orientation process.

A preamble of data package being transmitted can be used as an identification signal.

Upon the completion of transmission, a client transceiver of the network having a direction-agile antenna, as a rule, is switched to the reception mode accompanied by scanning with antenna beam in different directions.

A direction-agile antenna can be made in different ways. For example, a transceiver may be equipped with one antenna having several radiators with directional patterns that, taken together, cover no less than 360° by azimuth bearing or by the angle of elevation, or with directional patterns that, taken together, cover no less than a hemisphere or sphere by azimuth bearing and by the angle of elevation. A transceiver may be also made with several antennas, each of them either having only one radiator or multiple radiators, with directional patterns that, taken together, cover no less than 360° by azimuth bearing or by the angle of elevation, or with directional patterns that, taken together, cover the sphere by azimuth bearing and by the angle of elevation. It is also possible that other known design options of direction-agile antennas are employed in a transceiver.

In contrast to the prototype method, in which transmission and reception of signal is carried out by omnidirectional antennas, reception of a signal (including synchronization signal and identification signal) by client transceivers equipped with direction-agile antennas makes it possible to increase the range and the data transfer rate, improve the quality and reliability of communication, while having the same power of transmitted signal as in the prototype method. Introduction of a signal identification unit into a transceiver claimed herein allows avoiding interruptions in the process of antenna orientation in the case when an extraneous signal is received, thus avoiding the loss of data being transmitted during the reception of said extraneous signal.

In addition, transmission of data in the network via the best communication quality paths allows raising the rate of data transmission to an addressee.

Transmission of information with the aid of directional and omnidirectional antennas is used in systems of communication between a mobile transceiver (in particular, a mobile part of a cordless telephone) and stationary transceiver (in particular, base station of a cordless telephone) (See PCT/DE96/00020). However, in contrast to the invention claimed herein, a base station in the known method transmits information by an antenna, in a partial radio space of which only one mobile transceiver equipped with an omnidirectional antenna is located. With several mobile transceivers located in different points of the radio space, a base station would have to carry out transmission practically in the omnidirectional mode, thus making this radio communication method no different from a communication method with the use of omnidirectional antennas with all disadvantages inherent to the former method.

BRIEF DESCRIPTION OF THE DRAWINGS

The various embodiments, features and advances of the present invention will be understood more completely hereinafter as a result of a detailed description thereof in which reference will be made to the following drawings:

FIG. 8 presents an example of a link quality table containing stored data on the quality of communication (where: S/N is the ratio of a signal being received to the noise level);

DETAILED DESCRIPTION

Figure 1:
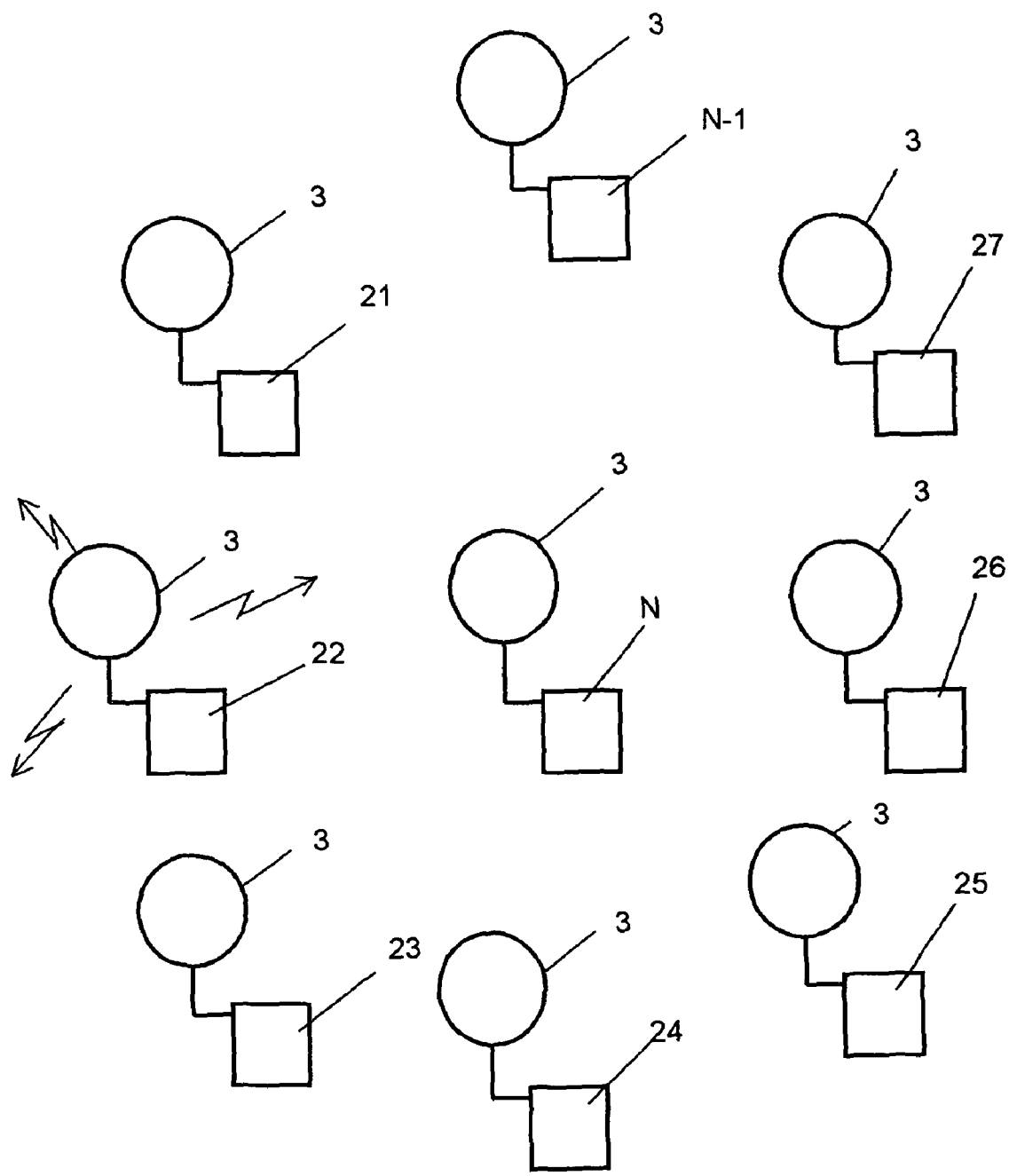
FIG. 1 illustrates the operation of WLAN in accordance with the known radio communication method.
Figure 2:
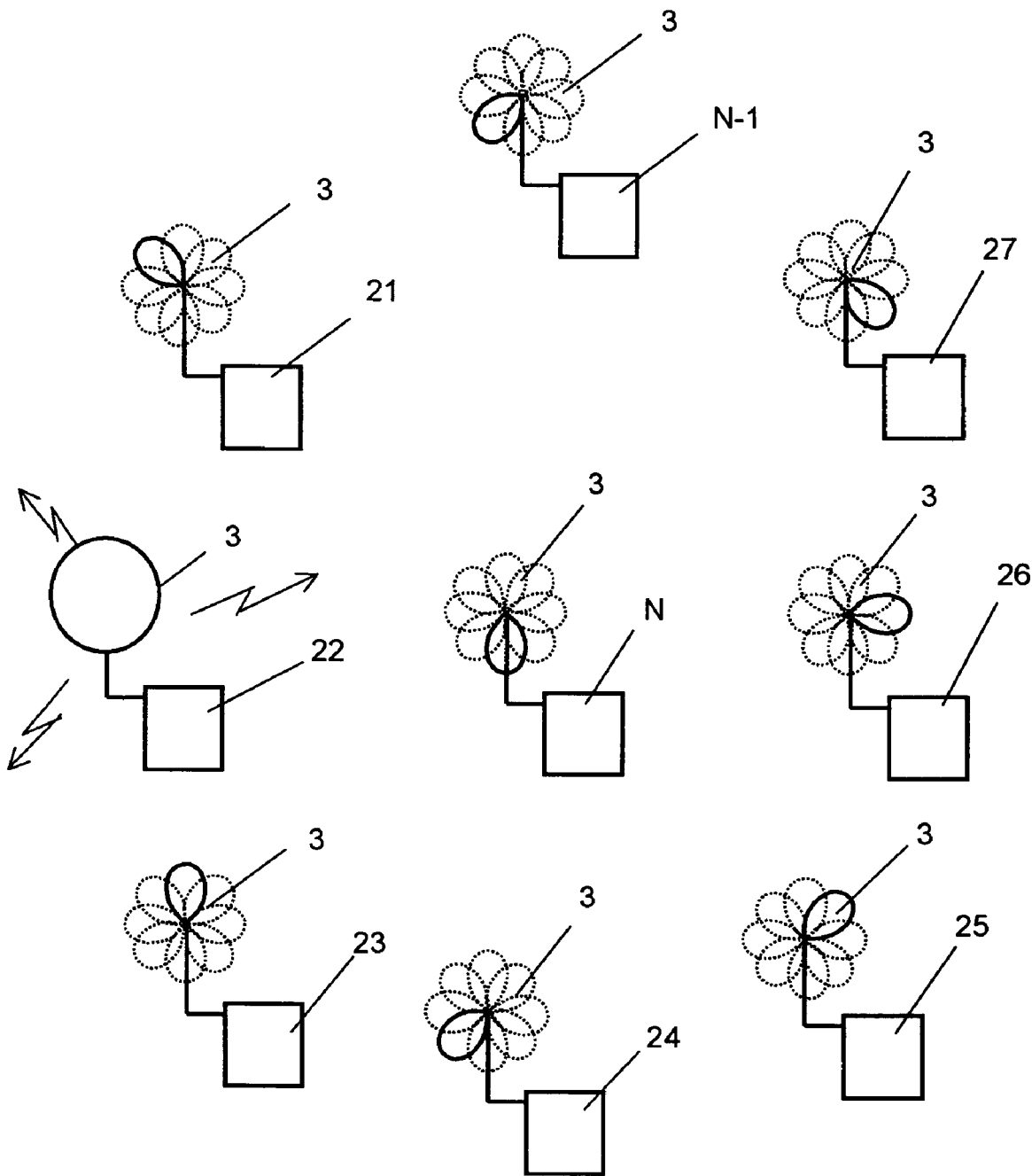
FIG. 2 illustrates the operation of antennas of WLAN transceivers during the search for the synchronization signal from the network coordinator.
Figure 3:
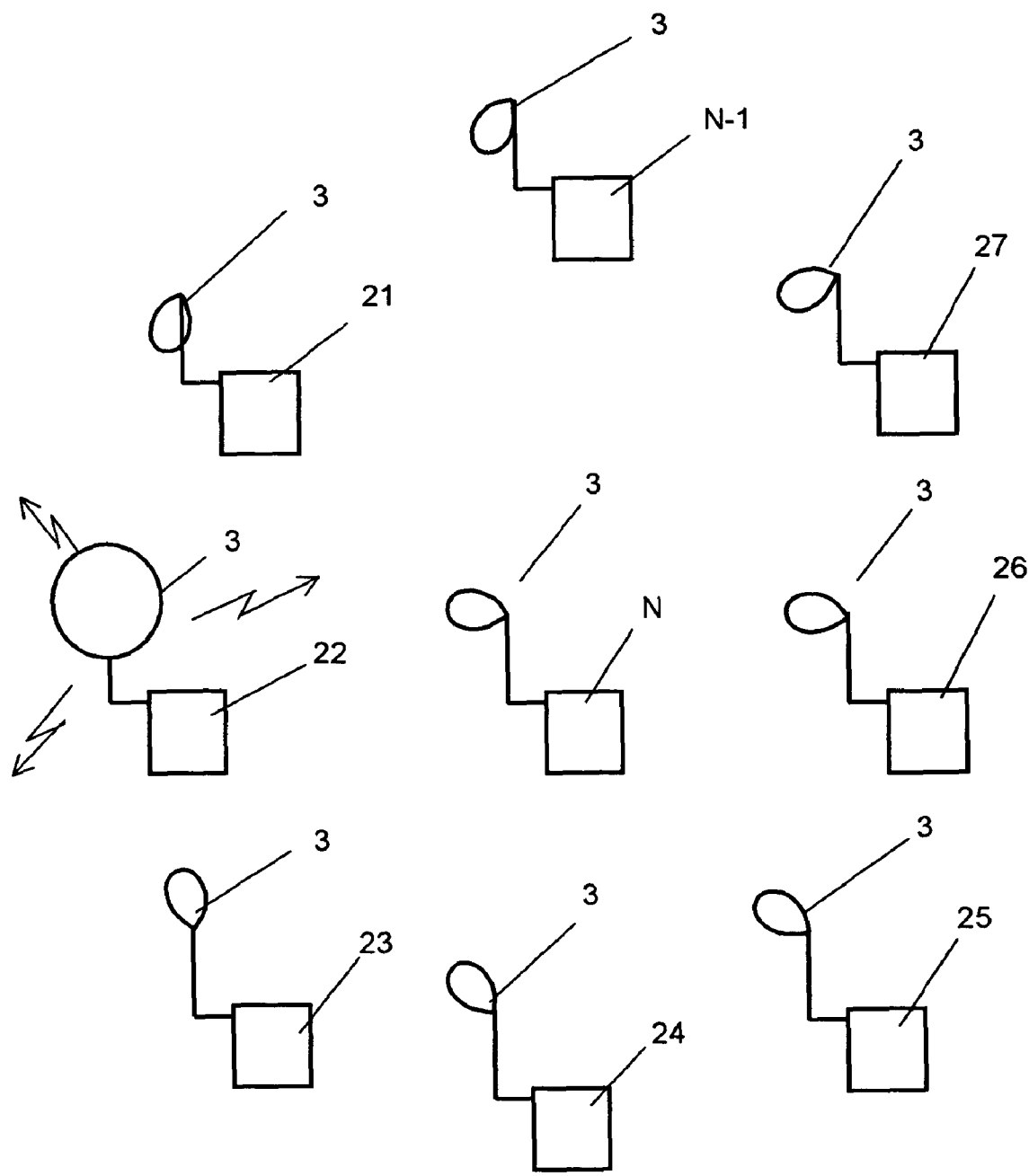
FIG. 3 illustrates the operation of antennas of WLAN client transceivers following the reception of the synchronization signal from the network coordinator.

The method for radio communication claimed herein exhibits its advantages to the highest extent when all transceivers constituting a network are equipped with direction-agile antennas (FIG. 2 and FIG. 3). However, the advantages of the method claimed herein are manifested to a certain extent even when WLAN includes at least two transceivers equipped with direction-agile antennas, because these transceivers would be able of operating in WLAN by the method claimed herein.

Figure 6:
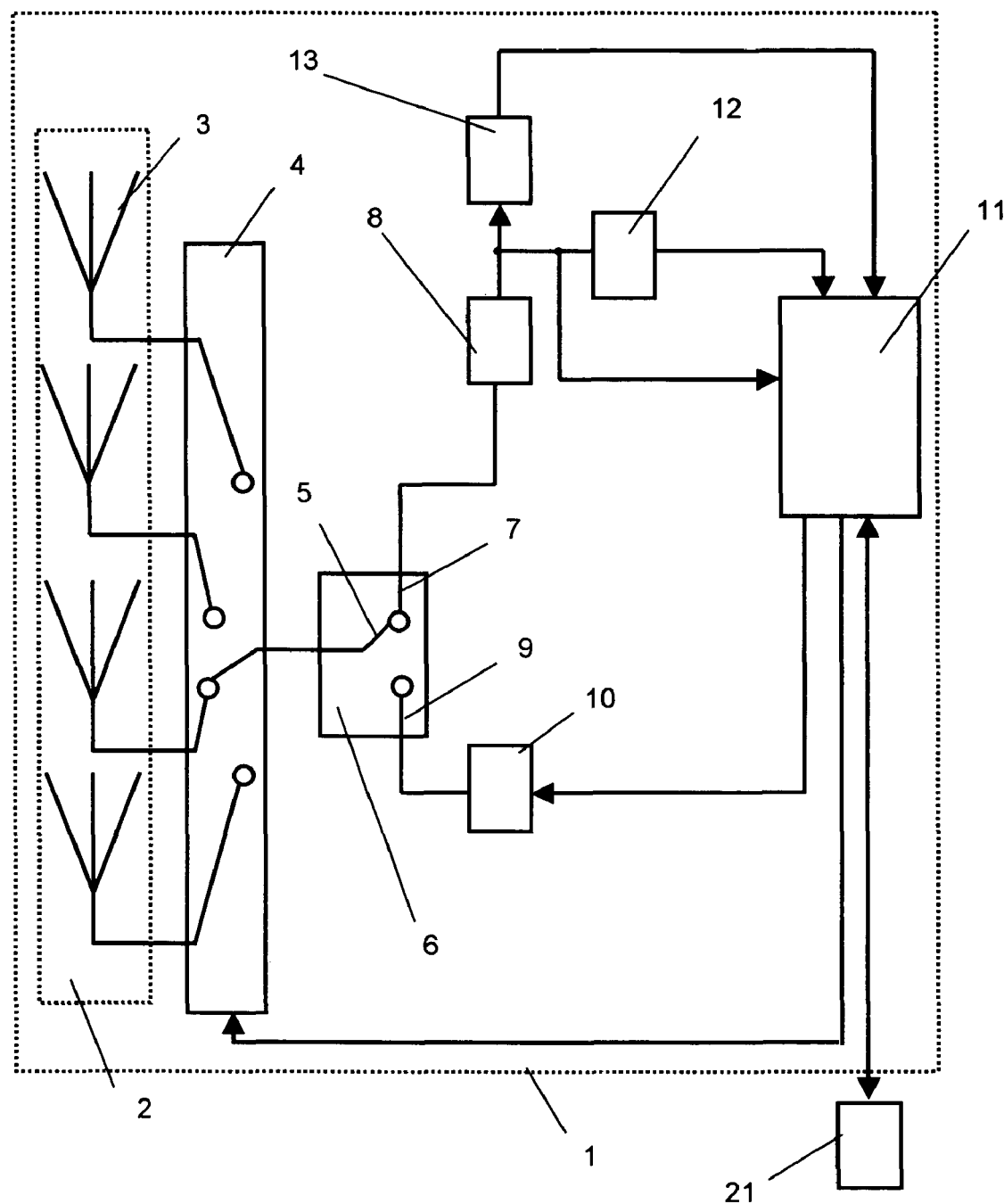
FIG. 6 presents a functional block diagram of the transceiver claimed herein switched-over in the client mode in the course of signal reception.
Figure 7:
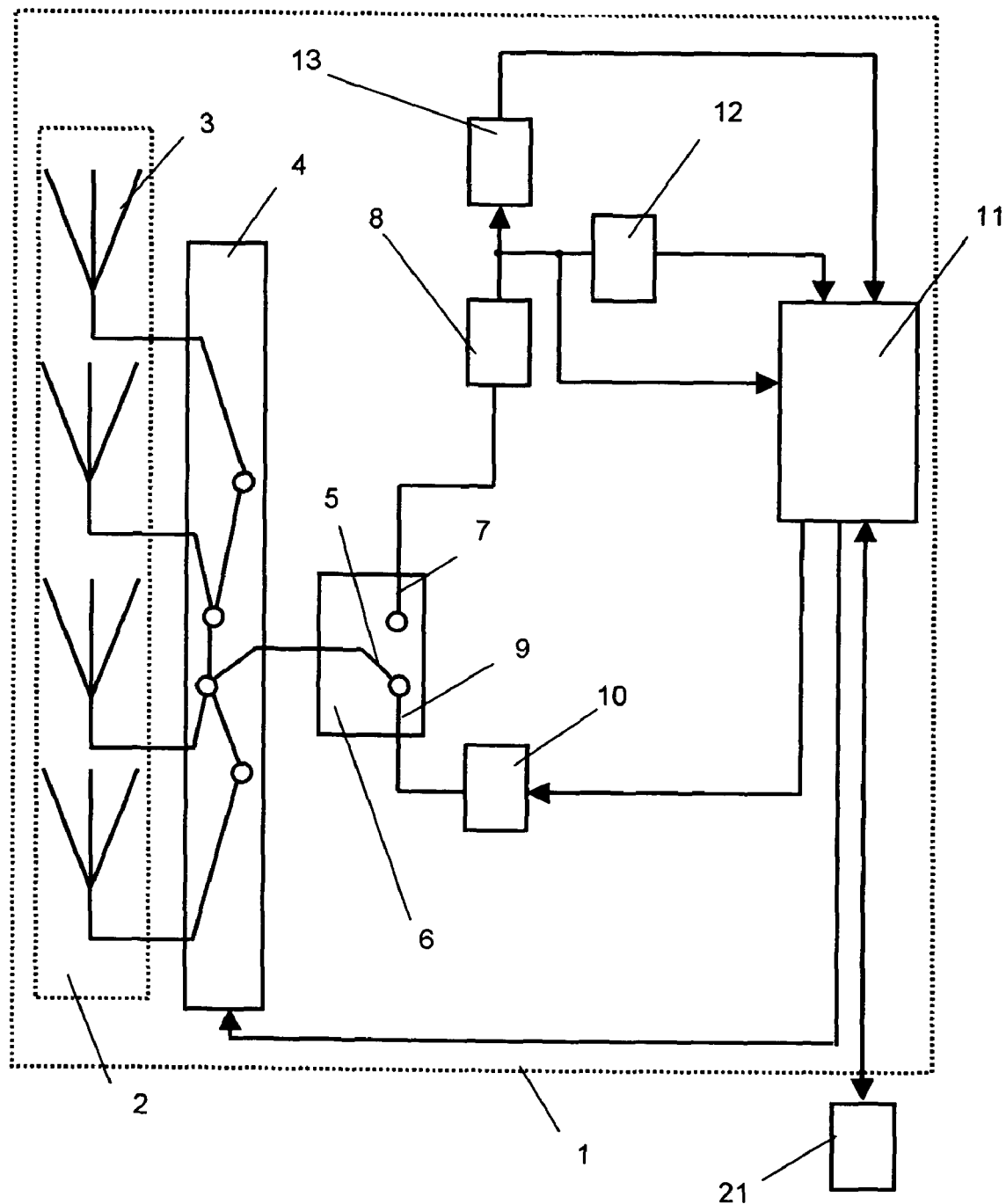
FIG. 7 presents a functional block diagram of the transceiver claimed herein switched-over in the network coordinator mode in the course of signal transmission.

The method for radio communication may be implemented by means of transceivers shown in FIG. 6 and FIG. 7. Transceiver 1 comprises antenna unit 2 consisting of at least one directional antenna 3 having directional pattern controlled by means of directional pattern switchover unit 4. In terms of design, antenna unit 2 can be made in many different ways—namely, in the form of one antenna 3 with at least two radiators with directional patterns that, taken together, cover no less than 360° by azimuth bearing or by the angle of elevation; in the form of one antenna 3 with at least three radiators (for example, with four or six radiators) with directional patterns that, taken together, cover the hemisphere or sphere by the azimuth bearing and by the angle of elevation. Antenna unit 2 may be also made with at least two said antennas 3, with each antenna having at least one radiator, the directional patterns of which, taken together, cover no less than 360° by the azimuth bearing or by the angle of elevation. As an example, FIG. 6 and FIG. 7 show a design option of antenna unit 2 having four directional antennas, each of which has only one radiator. Unit 2 may be made with at least three said antennas (each of which has at least one radiator) the directional patterns of which, taken together, cover the hemisphere or sphere by the azimuth bearing and by the angle of elevation. There are other design options for making antenna unit 2. Directional pattern switchover unit 4 is connected to the first input/output port 5 of reception/transmission switch 6. Output port 7 of reception/transmission switch 6 is connected to the input port of receiver 8, and the second input port 9 of reception/transmission switch 6 is connected to the output port of the transmitter 10. Output port of receiver 8 is simultaneously connected to the first input port of controller 11, to the input port of signal quality measurement unit 12 and to the input port of signal identification unit 13. The output port of the signal quality measurement unit 12 is connected to the second input port of controller 11, to the third input port of which the output port of signal identification unit 13 is connected. The first output port of controller 11 is connected to the directional pattern switchover unit 4, the second output port of controller 11 is connected to the input port of transmitter 10, and the third output port of controller 11 is designed to connect the former to user 21 (i.e. a device intended for the reception and/or transmission of information).

Figure 11:
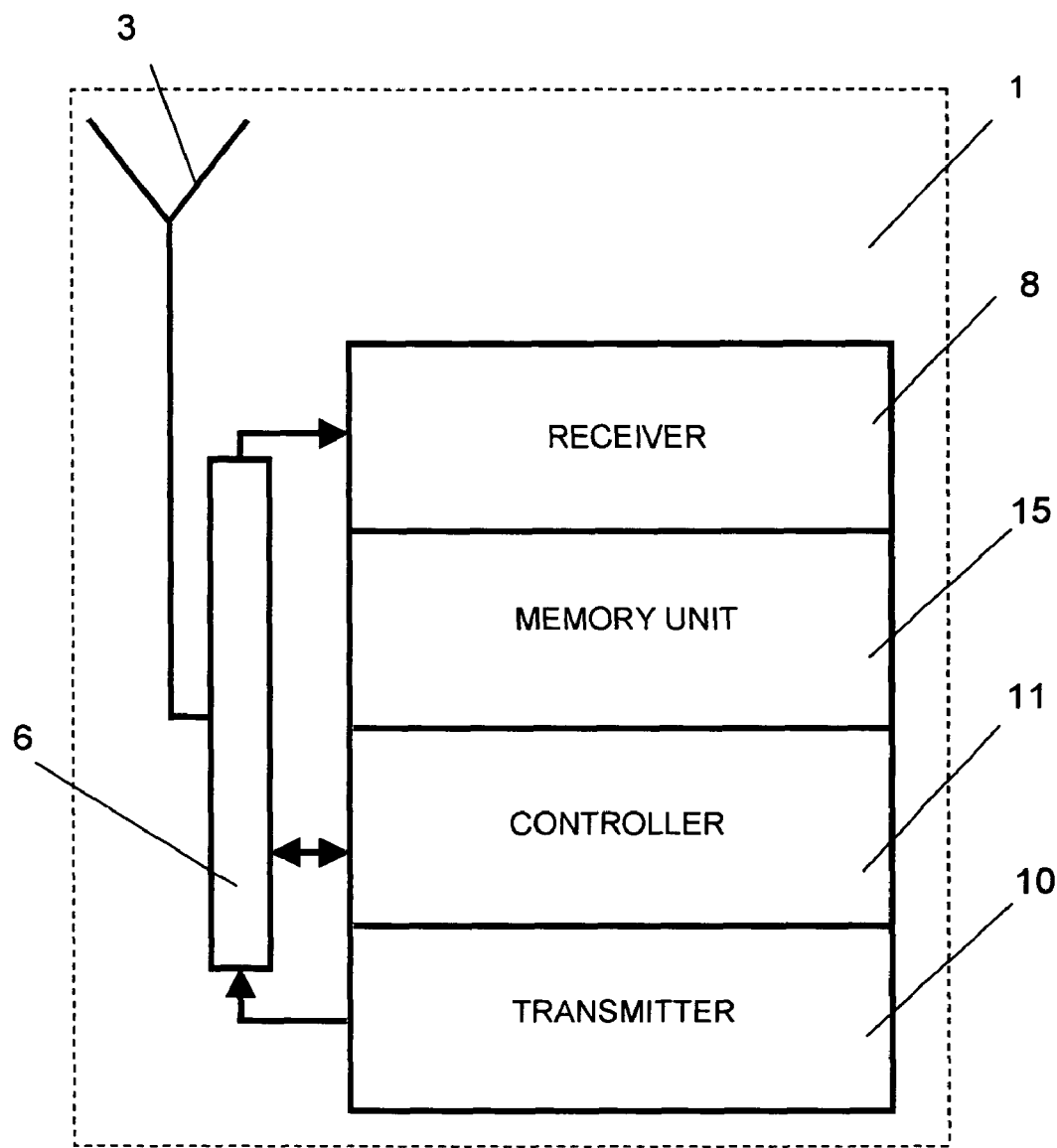
FIG. 11 presents the units of the transceiver (claimed herein), which are in operation when determining the quality of communication between WLAN transceivers.

When determining the quality of communication between all transceivers 1 of a network and when choosing a transmission path offering the best communication quality receiver 8, memory unit 14, controller 11, transmitter 10 and reception/transmission switch 6 to which antenna 3 is connected are used (see FIG. 11).

The method for radio communication in a WLAN that includes users 21, 22, 23 . . . N, each of which, for example, is equipped with transceiver 1, is implemented in the following manner.

Figure 4:
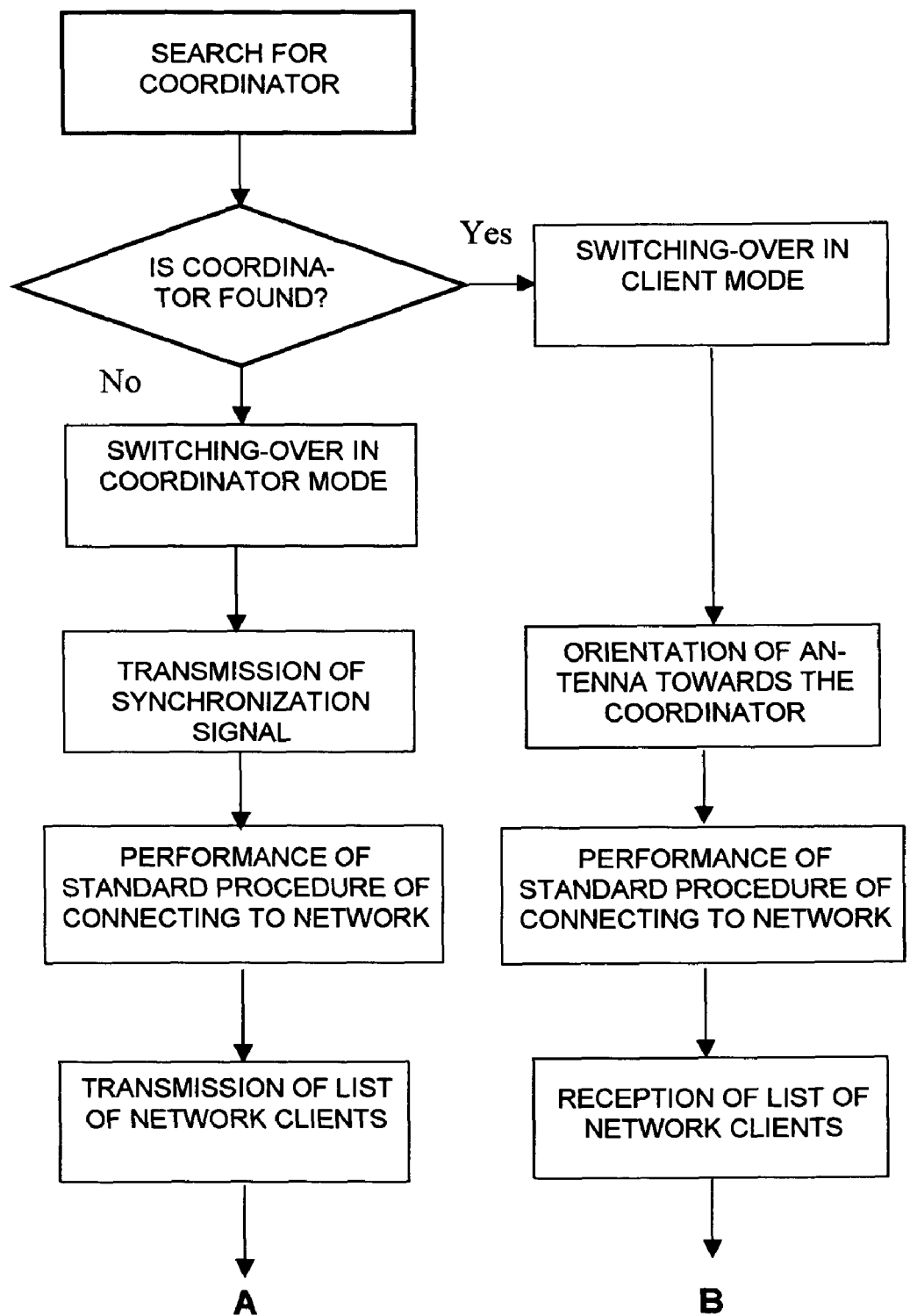
FIG. 4 illustrates the sequence of steps performed by a transceiver when it is being connected to WLAN.
Figure 5:
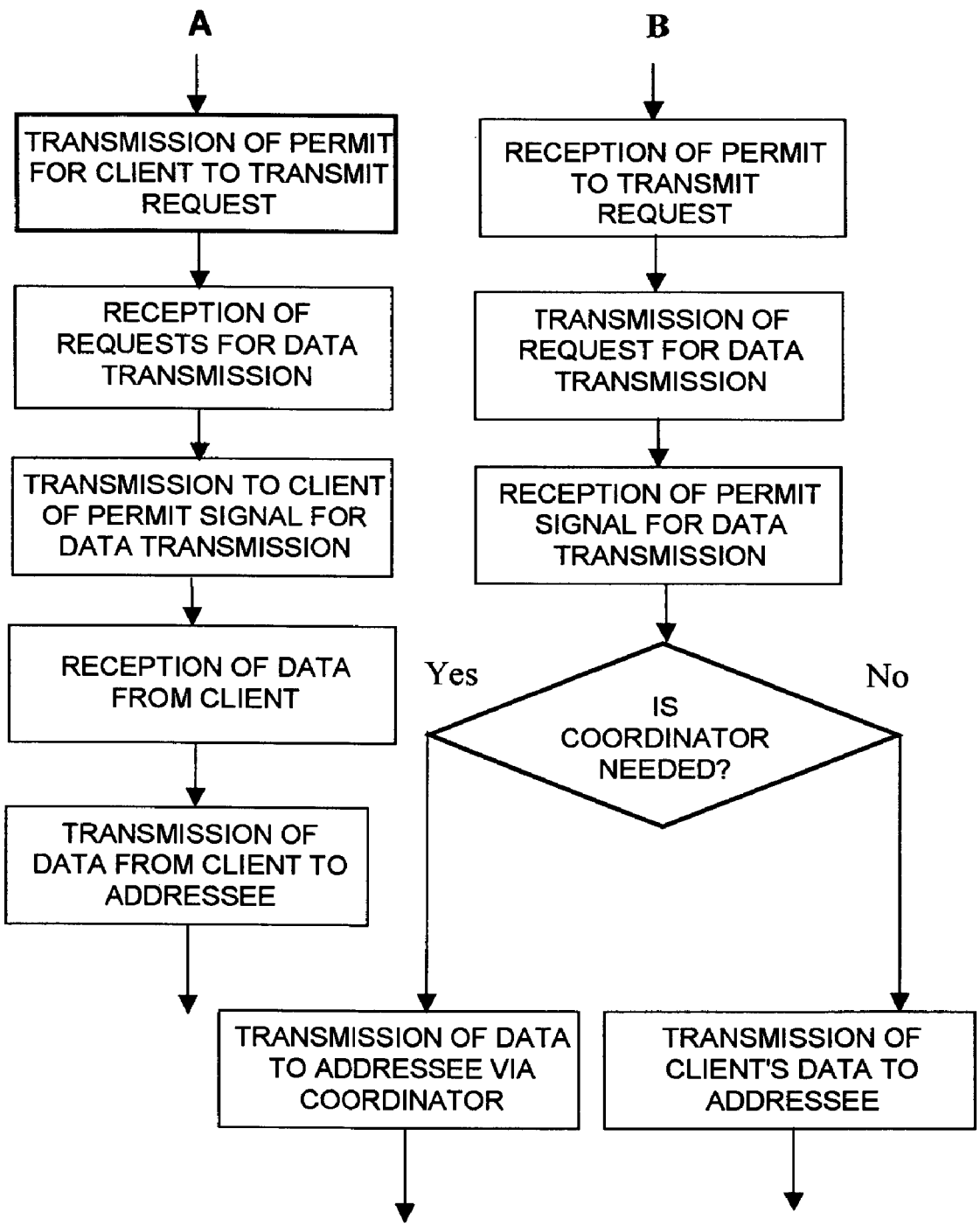
FIG. 5 illustrates the sequence of the main steps performed by network coordinator and client transceiver in the course of WLAN functioning.

When power supply for transceiver 1 is turned on, one of the users (for instance, user 22) performs scanning of radio space by means of antenna 3 that operates in directional mode. Said scanning may be performed in different ways—namely, by azimuth bearing, by the angle of elevation, or jointly by azimuth bearing and the angle of elevation thus covering the hemisphere or entire sphere of the radio space. The scanning may be performed in different manners—namely, step-by-step scanning (including step-by-step scanning in a part of radio space that was specified in advance and that offers best conditions for signal reception, scanning with a pitch of 45°, 60°, 90°, 120°, or 180° by electronic switching of directional pattern, and by other known scanning methods. If synchronization signal from the previously appointed network coordinator is not detected, transceiver 1 of user 22 switches-over from the reception mode in the temporary network coordinator mode with concurrent switching of antenna 3 in the omnidirectional radiation mode (see FIG. 2). While operating in this mode transceiver 1 of user 22 transmits synchronization signal that sets time and frequency parameters of the network. As this takes place, turned-on transceivers 1 of users 21, 23, 24 . . . N perform scanning of the radio space with antennas 3 operating in the directional mode (as described above). As soon as users 21, 23, 24 . . . N detect the synchronization signal from transceiver 1 of user 22 (who serves as a temporary coordinator for the network), they are switched-over in the mode of client transceivers of the network and perform the orientation of antenna beam of their antennas 3 in the direction of transceiver 1 of user 22 (i.e. in the direction of temporary coordinator for the network—see FIG. 3), who transmits a request for the connection to the network. Upon the reception of this request, transceivers 1 of users 21, 23, 24 . . . N transmit their identification signals (operating in the directional mode of antennas 3) to the temporary coordinator for the network, which based on the received identification signals transmits (operating in the omnidirectional mode of its antenna 3) a list of client transceivers 1 of users 21, 23, 24 . . . N connected to the network (see FIG. 4). Then functioning of WLAN proceeds in the following manner. Transceivers 1 of users 21, 23, 24 . . . N transmit their requests for transmitting data packets to an addressee in the network to the temporary coordinator for the network (in this process their antennas 3 operate in the directional mode). Said temporary coordinator receives said requests for data packets transmission, stores them and then sends a transmission permission signal to client transceivers 1 of users 21, 23, 24 . . . N. Upon the reception of said signals (permitting data transmission to an addressee) from the temporary coordinator, client transceivers 1 of users 21, 23, 24 . . . N transmit data (with their antennas 3 operating in the directional mode) to addressees either via the temporary coordinator or directly to an appropriate addressee (see FIG. 5).

Transmission of data in WLAN can be carried out via a transmission path that Offers the communication quality that at least is no worth than a certain threshold value specified in advance. In this case at first the quality of communication between all pairs of transceivers 1 of users 21, 23, 24 . . . N is determined. Said determination of communication quality may be performed, for example, through the use of units (shown in FIG. 11) of transceiver 1 in the following manner. Each of transceivers 1 of users 21, 23, 24 . . . N transmits an identification signal that includes data on the quality of communication with other WLAN transceivers and receives from other transceivers the same identification signals. To increase the communication range, reception of identification signals may be carried out when an antenna beam is oriented in the direction of a transceiver that operates in the transmission mode. Each transceiver 1 of users 21, 22, 23 . . . N extracts data on the quality of communication from received identification signals and then stores these data in memory unit 14 as current values for the purpose of subsequent transmission of information to a specific addressee in the network. Storage of communication quality data by each transceiver 1 of users 21, 22, 23 . . . N can be arranged for example in the form of link quality table that is represented by a two-dimensional array containing information on the quality of communication between all pairs of transceivers 1 of users 21, 22, 23 . . . N (see FIG. 8). The quality of communication may be determined for example based on the level of a signal being received or on the signal-to-noise ratio. The link quality table can be updated periodically to maintain the reliability of information contained in it. Updating of said table is performed through periodic repetition by each transceiver 1 of WLAN users 21, 22, 23 . . . N of the cycle consisting of transmission said identification signals to all other network transceivers, reception of identification signals and storage of received data on communication quality. The period of updating of said link/communication quality table can either be specified in advance (for instance, over a certain time interval in the range from 0.1 to 100 s) or vary dynamically in accordance with the rate of changes in the quality of communication between transceivers 1 of WLAN users 21, 22, 23 . . . N. For this purpose each transceiver 1 of users 21, 22, 23 . . . N compares communication quality data stored after the previous cycle with those stored after the current cycle. If variation in data values doesn't exceed a certain pre-specified value, the time interval between cycles of communication quality determination is either kept the same as it was or increased. If data values stored after the previous cycle differ from those stored after the current cycle by a value that exceeds said pre-specified value, then the time interval between cycles of communication quality determination is decreased. Communication quality data listed in the link quality table are then replaced with updated data obtained as a result of the latest cycle that serve as current data. Storage of communication quality data and their processing can be also arranged by any other known method.

Figure 9:
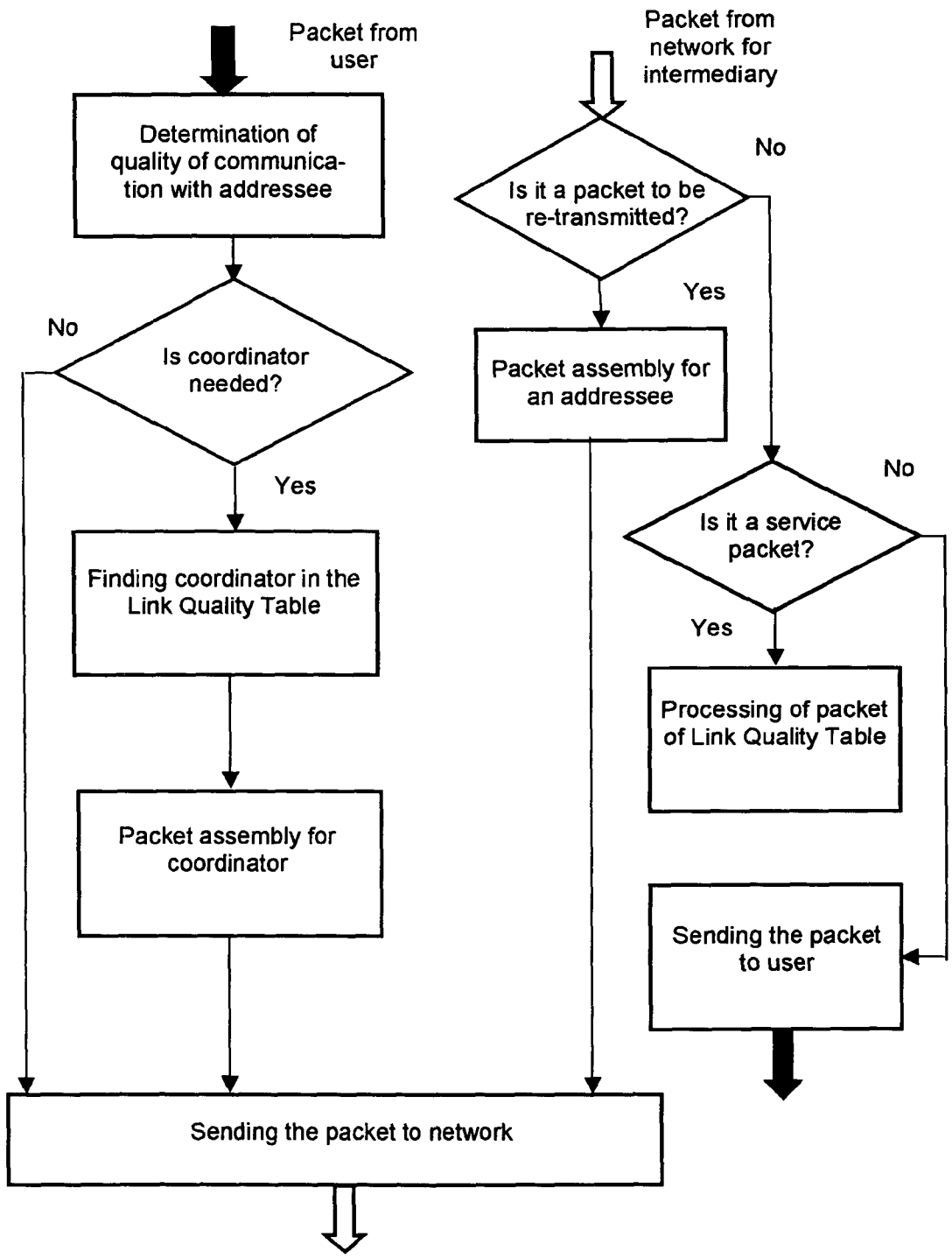
FIG. 9 illustrates the sequence of the steps performed by WLAN coordinator and client transceiver in the course of data transmission with consideration for the quality of communication by a transmission route.
Figure 10:
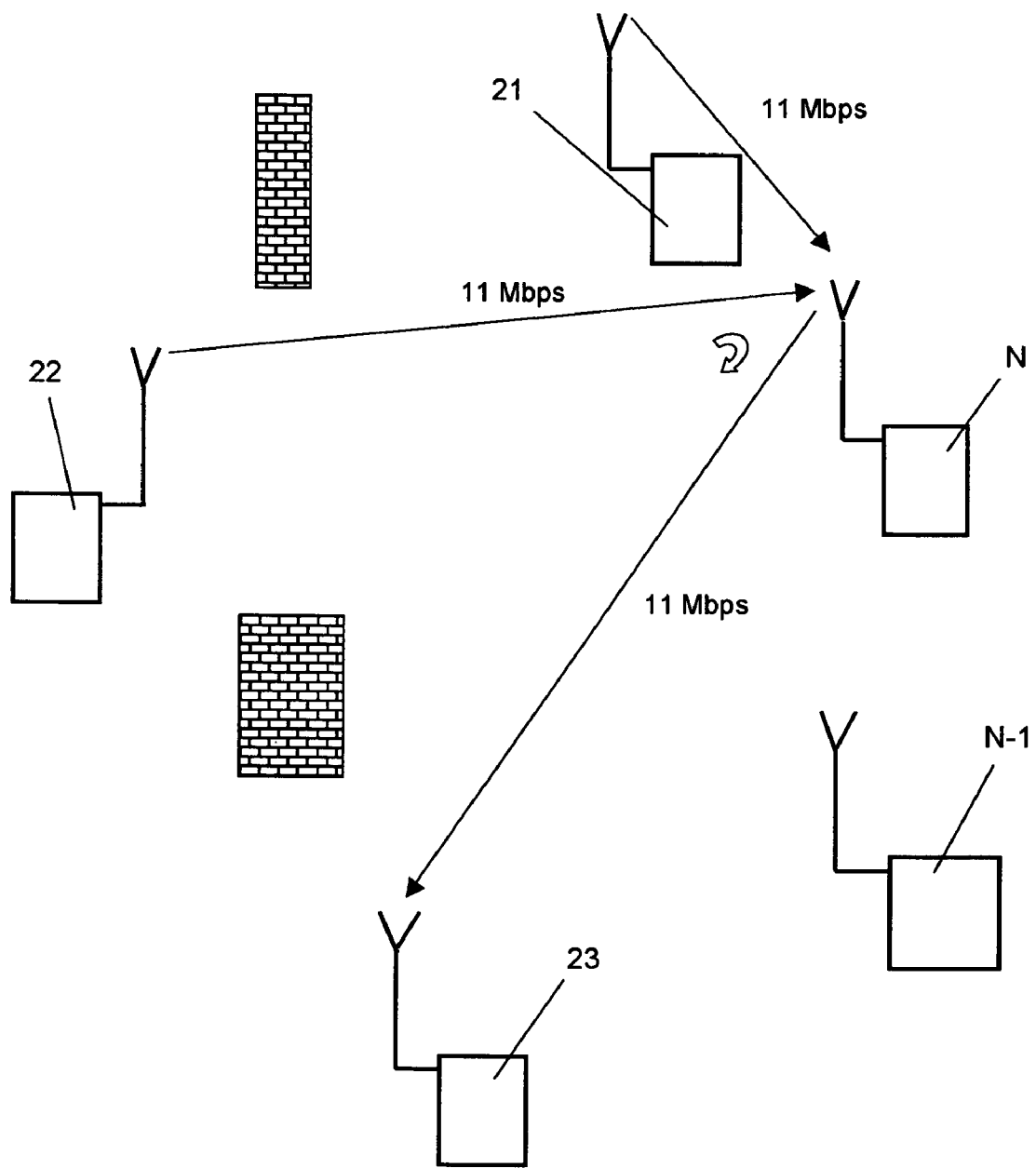
FIG. 10 illustrates the transmission of information in WLAN with consideration for the quality of communication by a transmission route.

After receiving a transmission permit signal from the temporary network coordinator (for example, from transceiver 1 of user N—see FIG. 10), client transceivers of users 21 and 22 perform the transmission of data (based on stored current data on communication quality) to transceiver 1 of user 23 either via said temporary coordinator or directly to an addressee via transmission route that offers the quality of communication that is either better or equal to a specified threshold value (see FIG. 9). Transmission of data is carried out at a rate determined based on stored communication quality data. The quality of peer-to-peer communication with said addressee is taken as said threshold value.

Technical Applicability

Using the method claimed herein a radio communication session was conducted in a WLAN in accordance with the following Standards: IEEE 802.11, IEEE 802.11a, IEEE 802.11b, ISO 8802-11 and HIPELAN Type 2. Data are transmitted in packets in WLANs of these types. Such packets were used by a transceiver operating in the mode of a temporary network coordinator for transmitting a synchronization signal as well as by transceivers switched-over in the client mode for transmitting identification signals. The minimal duration of synchronization signals was of the order of 200 □s. These signals were used for the purpose of orientation of directional antenna 3 (the directional pattern of which was switched-over electronically) in the direction of signal source.

The claimed method for radio communication that determines the actions of a temporary network coordinator and client transceivers is in essence a "superstructure" in relation to Standards mentioned above. It should be pointed out here that the reception of data packet is performed by antennas 3 having directional pattern offering high amplification factor. This fact makes it possible to expand the area of reliable reception quite significantly (increase of the radius of 11 Mbps reliable transmission/reception zone to the radius of 1 Mbps reliable transmission/reception zone).

Possible options for the embodiment of the data transmission method claimed herein as well as WLANs and transceivers that implement said method are not limited by examples and drawings described above.

REFERENCES CITED

1. U.S. Pat. No. 5,912,921, Int. Cl. H04 B 1/38, publ. 15 Jun. 1999.
2. U.S. patent application Ser. No. 09/797,085, publication No. 2001/0012757, Int. Cl. H04Q 7/20, publ. 9 Aug. 2001.
3. Great Britain Application No. 9900593, publication No. WO No. 00/42737, Int. Cl. H04L 12/28, publ. 20 Jul. 2000.
4. U.S. Pat. No. 6,026,303, Int. Cl. H04Q 7/00, publ. 15 Feb. 2000.
5. U.S. patent application Ser. No. 09/773,418, publication No. 2001/0012275, Int. Cl. H04B 7/212, publ. 9 Aug. 2001.
6. U.S. Pat. No. 6,075,780, Int. Cl. H04B 7/155, publ. 13 Jun. 2000.
7. EP No 0859490, Int. Cl. H04L 12/28, publ. 19 Aug. 1998.
8. U.S. patent application Ser. No. 09/795,003, publication No 2001/0024952, Int. Cl. H 04 M 1/66, publ. 27 Sep. 2001.
9. U.S. patent application Ser. No. 09/736,600, publication No 2001/0002469, Int. Cl. G 06 F 7/00, publ. 31 May 2001
10. PCT/DE96/00020, publication No. WO 96/22646, Int. Cl. H04B 7/26, publ. 25 Jul. 1996.

The invention claimed is:

1. A method for radio communication in a wireless local area network consisting of a multitude of transceiving devices capable of operating in a peer-to-peer mode wherein the method comprises:
   (a) designating a temporary coordinator transceiver of the wireless local area network of a plurality of transceivers of the wireless local area network;
   (b) switching-over all of the other plurality of transceivers of the wireless local area network into a mode of a client of the wireless local area network, wherein a transceiver in a mode of a client is a client-transceiver;
   (c) orienting an antenna beam of each client transceiver of the plurality of transceivers of the wireless local area network in the direction of the temporary coordinator transceiver of the wireless local area network, each of the plurality of transceivers comprising a direction-agile antenna.
   (d) transmitting a transmission-permitting signal from the temporary coordinator transceiver of the wireless local area network to at least one of the client transceivers of the plurality of transceivers of the wireless local area network;
   (e) transmitting the information by the at least one of the client transceivers of the plurality of transceivers of the wireless local area network that permission has been granted to transmit from the temporary coordinator transceiver to an addressee;
   wherein each of the plurality of transceivers comprises an antenna unit comprising a plurality of direction-agile antennas, a directional pattern switchover unit for controlling the directional pattern of each of the plurality of direction-agile antennas, a reception/transmission mode switch for switching from a transmission mode to a reception mode, a receiver, a transmitter, and a controller, wherein the reception/transmission mode switch comprises an input/output port, an output port connected to the receiver, and an input port connected to the transmitter, wherein the input/output port is connected to a single direction-agile antenna of the plurality of direction-agile antennas and the output port when the transceiver is a client transceiver, and the input/output port is connected to all of the plurality of direction-agile antennas and the input port when the transceiver is the temporary coordinator transceiver.

2. The method of claim 1 wherein upon the designation as a said temporary coordinator of said network a transceiver successively performs the following steps with its antenna being in omnidirectional mode: (a) transmission of synchronization signal, (b) transmission of periodic signals with the aim to orient antenna beam of at least one said client-transceiver of said network equipped with said direction-agile antenna, (c) transmission of request for connecting new said client-transceivers to said network.

3. The method of claim 2 wherein said transceiver switched-over into the mode of a client of said network performs the following: (a) reception of a request for connection to said network from said temporary coordinator, (b) transmission of its identification signal to said temporary coordinator with the aim to get connected to said network, while in response to received identification signal from said client-transceiver said temporary coordinator performs the following: (a) transmission of confirmation that said client-transceiver has been connected to said network, (b) transmission of a list of said client-transceivers connected to said network to all client-transceivers of said network.

4. The method of claim 1 wherein prior to transmitting information to an addressee said client-transceiver of said network performs the transmission of a request for information transmission to an addressee, while said temporary coordinator of said network receives and stores requests of client-transceivers belonging to said network.

5. The method of claim 1 wherein the following steps are performed when designating said temporary coordinator of said network and switching-over of the rest of the transceivers into the mode of a client of said network: (a) the search by a transceiver of said network switched into the reception mode for a synchronization signal and/or identification signal from a previously designated temporary coordinator of said network; (b) the switch-over of said transceiver from the reception mode into the mode of temporary coordinator of said network in the case when no synchronization signal and/or identification signal from a previously designated temporary coordinator of said network is detected in radio space; (c) the switch-over of said transceiver into the mode of a client of said network in the case when said synchronization signal and/or identification signal is detected in radio space.

6. The method of claim 5 wherein the search by a transceiver of said network equipped with a direction-agile antenna for said synchronization signal and/or identification signal is conducted via scanning the radio space by antenna beam in different directions.

7. The method of claim 1 wherein said client-transceiver performs transmission of information to an addressee via said temporary coordinator of said network.

8. The method of claim 1 wherein the transmission of information by said client-transceiver is performed directly to an addressee.

9. The method of claim 1 wherein each said transceiver of said network performs the following steps upon the reception of a signal from said temporary coordinator of said network (a) determination of the quality of communication with all other transceivers of said network, (b) storage of data on the quality of communication contained in said received signals.

10. The method of claim 9 wherein the determination of the quality of communication includes the following (a) transmission by each transceiver of said network of an identification signal that includes data on the quality of communication with other transceivers of said network, (b) reception by each said transceiver of said network of said identification signal from other transceivers of said network.

11. The method of claim 10 wherein said transceiver of said network equipped with a direction-agile antenna receives said identification signal when its antenna beam is oriented in the direction of said transceiver being in the mode of transmission of said identification signal.

12. The method of claim 9 wherein said transceiver of said network transmits information to an addressee from among transceivers of said network by a route that ensures such quality of communication that either exceeds or equal to a specified threshold value.

13. The method of claim 12 wherein the quality of communication in the peer-to-peer operation mode with said addressee is taken as a specified threshold value.

14. The method of claim 9 wherein the quality of communication is determined based on the level of a signal being received.

15. The method of claim 9 wherein the quality of communication is determined based on the ratio of a received signal level to noise level.

16. The method of claim 9 wherein the cycle of said determination of the quality of communication and storage of said data on communication quality is repeated periodically.

17. The method of claim 16 wherein the cycle of said determination of the quality of communication and storage of said data on communication quality is repeated at a time interval from 0.1 s to 100 s.

18. The method of claim 16 wherein said data on communication quality stored after a previous said cycle are replaced with said data on communication quality stored after the said next cycle.

19. The method of claim 16 wherein said data on communication quality stored after a previous said cycle are compared with said data on communication quality stored after the said next cycle and when data values of both cycles are the same, the time interval between said cycles is kept the same as it was.

20. The method of claim 16 wherein said data on communication quality stored after a previous said cycle are compared with said data on communication quality stored after the said next cycle and when data values of both cycles are the same, the time interval between said cycles is increased.

21. The method of claim 16 wherein said data on communication quality stored after a previous said cycle are compared with said data on communication quality stored after the said next cycle and when data values of one cycle are different from data values of another cycle, the time interval between cycles is decreased.

22. A wireless local area network comprising: a plurality of transceivers, wherein one of the plurality of transceivers is a temporary coordinator transceiver and the other transceivers of the plurality of transceivers are client transceivers, wherein each of the plurality of transceivers comprises an antenna unit comprising a plurality of direction-agile antennas, orienting the antenna beam of each client transceiver of the plurality of transceivers of the wireless local area network in the direction of the temporary coordinator transceiver of the wireless local area network, each of the plurality of transceivers comprising a direction-agile antenna, transmitting a transmission-permitting signal from the temporary coordinator transceiver of the wireless local area network to at least one of the client transceivers of the plurality of transceivers of the wireless local area network, transmitting the information by the at least one of the client transceivers of the plurality of transceivers of the wireless local area network that permission has been granted to transmit from the temporary coordinator transceiver to an addressee, a directional pattern switchover unit for controlling the directional pattern of each of the plurality of direction-agile antennas, a reception/transmission mode switch for switching from a transmission mode to a reception mode, a receiver, a transmitter, a signal identification unit, and a controller, wherein the reception/transmission mode switch comprises an input/output port, an output port connected to the receiver, and an input port connected to the transmitter, wherein the input/output port is connected to a single direction-agile antenna of the plurality of direction-agile antennas and the output port when the transceiver is a client transceiver, and the input/output port is connected to all of the plurality of direction-agile antennas and the input port when the transceiver is the temporary coordinator transceiver.

23. A wireless local area network of claim 22 wherein each of the plurality of transceivers is capable of omnidirectional transmission of a signal including a synchronization signal or an identification signal.

24. A wireless local area network of claim 22 wherein each of the plurality of transceivers further comprises a link quality table.

25. A transceiver for a wireless local area network, the transceiver comprising:

an antenna unit comprising a plurality of direction-agile antennas;

a directional pattern switchover unit for controlling the directional pattern of each of the plurality of direction-agile antennas;

a receiver;

a transmitter;

a reception/transmission mode switch for switching from a transmission mode to a reception mode, the reception/transmission mode switch comprising an input/output port, an output port connected to the receiver, and an input port connected to the transmitter; and a controller;

wherein the input/output port is connected to a single direction-agile antenna of the plurality of direction-agile antennas and the output port when the transceiver is a client transceiver, and the input/output port is connected to all of the plurality of direction-agile antennas and the input port when the transceiver is the temporary coordinator transceiver.

26. A transceiver of claim 25 further comprising a signal quality measurement unit for determining a link quality between the transceiver and each other of transceivers of the network in successive consecutive ones of the periods and for storing data on link quality in respect of subsequent time periods from the time periods.

* * * * *